May 9, 1944.　　　W. C. WELCH　　　2,348,373

LOCKING DEVICE

Filed April 22, 1942

INVENTOR
William C. Welch
BY
Pennie, Davis, Marvin & Edmonds
ATTORNEYS

Patented May 9, 1944

2,348,373

UNITED STATES PATENT OFFICE 2,348,373

LOCKING DEVICE

William C. Welch, Philadelphia, Pa.

Application April 22, 1942, Serial No. 440,006

1 Claim. (Cl. 85—32)

This invention relates to a locking or securing device to prevent the unauthorized removal or theft of various elements or members attached to other structures such as automobile wheels, tire rims and the like. The invention aims to provide an improved locking device including a threaded nut or bolt constructed and arranged to prevent its removal with ordinary tools.

The device of the invention comprises a securing part and a tool-engaging or operative part constructed and arranged to engage standard wrenches and the like. The securing part is threaded in the usual way to serve as a nut or bolt and the projecting part or head is so constructed that it is difficult, if not practicably impossible, to grip it with any standard tool and effect its removal by unscrewing it. The head is circular in cross-section, preferably cylindrical, and the end of the head is sloped or curved to effect operative engagement with the operative part and also to eliminate all surfaces or projections which may be engaged with a tool to effect its removal. I prefer to slope the end towards the center from opposite sides as, for example, by milling it to a convex surface. The operative part is provided with a seat formed to engage the sloping end of the securing part, and a means of attaching the securing part to the operative part, permitting the two parts to be held together as a unitary device for the purposes of screwing the securing part into position or removing it. I have found it advantageous to shape the end of the securing part with a convex surface and the operative part with a concave seat so that both parts effect a close non-rotatable engagement with each other when coupled together. The operative part is shaped to be engaged by a standard wrench, screw-driver or other tool, a very practical form being that of a common hexagonal nut or bolt head. I prefer to fasten the two parts together with a coupling screw which will hold them together while screwing or unscrewing the securing part and which will also permit the operative part to be removed easily as by means of a screw-driver. When the operative part is placed over the securing part with the convex and concave surfaces together and the two parts are held together with the coupling screw, the securing part may be screwed into position or removed merely by using a wrench on the operative part.

The securing device of the invention may be so constructed that a particular operative device can be used only on a particular securing device, thereby making it difficult, if not impossible, for a person in possession of one operative device to use it on but one type of securing device. I may, for example, use different sizes and shapes of curves and slopes for the engaging seats of various models, thereby making their interchangeability difficult. I may also use coupling screws of different diameters and with different sizes of threads to complicate further the unauthorized use of an operative part and its coupling screw.

In the case of the usual automobile wheel which is fastened to the hub by a number of bolts or nuts, I may replace one of the nuts or bolts, as the case may be, with a securing part of the invention. In this advantageous application of the invention, the securing part is screwed into tight position and then the operative part is removed after removal of the coupling screw. The invention is especially applicable to automobile wheels because the hub and tire extend beyond the place where the securing part is located, increasing the difficulty of effecting its removal. Moreover, in the case of automobiles, several securing parts are required with but one operative part and coupling screw. In such instances, the single operative part and coupling screw serve as a master key for each of the securing parts used.

These and other novel features of the invention will be better understood after considering the following description taken in conjunction with the accompanying drawing, in which.

Figure 3:
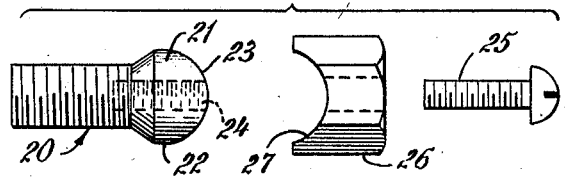
Fig. 3 is a side view of an assembly of parts in an application of the locking device of the invention to a bolt.
Figure 4:
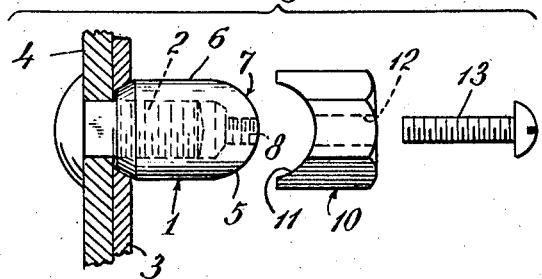
Fig. 4 is a side view of an assembly of parts in an application of the locking device of the invention to a nut for a stud bolt.
Figure 5:

Fig. 5 is a side view of a securing part and an operative part in coupled position and turned 90° on the longitudinal axis from the position of Figs. 3 and 4, and Figs. 6 and 7 are side views of modified forms of the invention.

Figure 1:
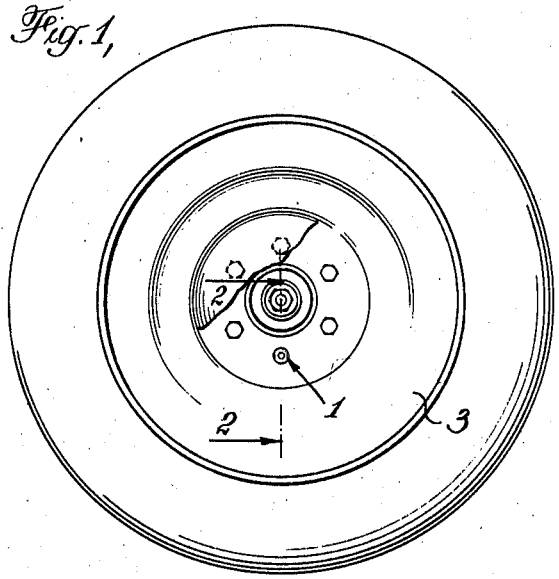
Fig. 1 is the side view of an automobile wheel illustrating the use of a securing part of the invention.
Figure 2:
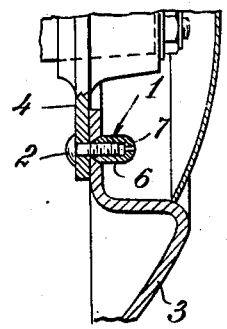
Fig. 2 is an enlarged fragmentary sectional view taken along the line 2—2 of Fig. 1.

The locking device of the invention, particularly that form thereof illustrated in Figs. 1, 2 and 4, comprises a securing part 1 in the form of a nut to be used in place of the ordinary nut such as is used with a stud bolt 2 to secure an automobile wheel 3 to a hub 4. The securing part is of considerably greater length than the usual nut to enable the end 5 to extend beyond and envelop the end of the stud bolt. In this form of the invention the entire projecting part may be regarded as the head. As shown in the drawing, the head has cylindrical sides 6, a convex end-surface 7 and a central tapped hole 8 embracing the longitudinal axis of the securing part.

The operative part 10 has an exterior in the form of the usual hexagonal nut and a concave seat 11 constructed and arranged to fit closely the convex curve 7 of the securing part. A hole 12 through the longitudinal axis of the operative part is provided to accommodate the coupling screw 13. When the operative part is in engagement with the securing part, as shown in Fig. 2, the coupling screw is inserted through the hole 12 and threaded into the tapped hole 8, thereby securing the two parts together. The unitary structure thus formed may be used as an ordinary nut, since the hexagonal configuration of the operative part enables it to be engaged with the usual wrenches or similar tools. The head of the coupling screw may be slotted for a screw-driver as shown, or in the form of a common bolt. In any case it must be screwed down tightly when the operative part is in position for use.

In order to prevent the unauthorized removal of the securing part and thereby to steal the wheel, the coupling screw is unscrewed by means of a screw-driver and then the operative part is removed.

As shown in Fig. 3, the invention is applied to the usual bolt, and particularly to a bolt of the type commonly used to secure wheels or tires to automobiles. The bolt 20 comprises a head 21, the exterior surface 22 extending in the direction of the longitudinal axis being cylindrical and the end surface 23 being convex. The central part of the head has a tapped hole 24 to accommodate the coupling screw 25. The operative part 26 has an exterior in the form of the usual hexagonal nut and a concave seating surface 27 constructed and arranged to fit the curve 23 of the bolt head. When these three parts are assembled for use as illustrated in Fig. 5, the operative part 26 is placed in position with the surfaces 23 and 27 together and the coupling screw 25 is screwed into position by means of a screw-driver.

In the forms of the invention illustrated in Figs. 1 to 5, the convex and concave seating surfaces are cylindrical curves and are formed in a milling operation which cuts the surfaces at right angles to the longitudinal axis of the two parts. Other curves or slopes may be formed in the same manner or the parts may even be forged or cast to shape.

Figure 6:
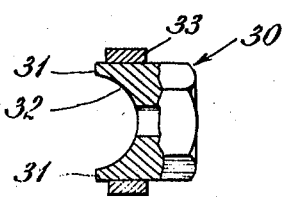

Fig. 6 illustrates a modified form of operative part 30 in which the projections 31 which result from cutting out the metal to provide the seat 32 are reenforced by means of a band 33 in tight engagement with the exterior. This band may be driven or shrunk into position, or even welded to the operative part. This form of the invention is especially applicable for those uses where the bolt or nut, as the case may be, is likely to become frozen requiring an excessive turning force to remove it. The band under such circumstances prevents a spreading of the projections 32 and a loosening of the grip of the two parts.

Figure 7:
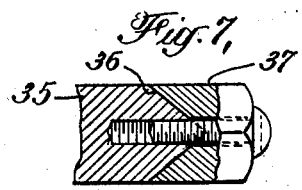

In the form of the invention illustrated in Fig. 7, the securing part 35 has a sloping wedge-shaped end 36 and the operative part 37 has a V-shaped seat constructed to effect a close seating engagement with the surface 36.

The various forms of securing parts illustrated in the drawing have such sloping exterior surfaces that they cannot be gripped with any ordinary tool or driven around by means of a punch or chisel. It is to be understood that while the operative parts have been illustrated to be used as ordinary nuts operated by a wrench they may be shaped to be turned with various other tools such as screw-drivers and the like.

One important feature of the invention is the ease with which I may prevent or discourage the unauthorized use of the operative parts and coupling screws in removing the securing parts. I may vary the sizes and shapes of the sloped ends and seating surfaces, and the size and threads of the coupling screws. In this manner I may make large numbers of sets of devices which do not have interchangeable parts and only by sheer coincidence may the possessor of an operative part and coupling screw find a securing part with which they may be used.

I claim:

A locking device for automobile wheels and the like which comprises a securing part having a head and screw threads permitting it to be screwed into engagement with a member to be held in place, the central portion of the head being entirely circular in cross-section and the end convex, thereby eliminating projections which may be engaged by a wrench, an operative part shaped to be engaged by an ordinary wrench and having a concave seat adapted to engage the convex end of the securing part, a tapped hole in the securing part, a hole in the operative part, and a screw adapted to be inserted in the hole of the operative part and be threaded into the tapped hole of the securing part removably holding the operative part to the securing part.

WILLIAM C. WELCH.